United States Patent

Schade

Patent Number: 5,248,098
Date of Patent: Sep. 28, 1993

[54] METHOD FOR REMOVING CONTAMINANTS FROM CONTAMINATED MATERIALS SUCH AS CONTAMINATED SOILS AND CONSTRUCTION DEBRIS

[76] Inventor: Horst Schade, In der Marpe 16, 4630 Hattingen, Fed. Rep. of Germany

[21] Appl. No.: 824,820

[22] Filed: Jan. 22, 1992

[30] Foreign Application Priority Data

Feb. 8, 1991 [EP] European Pat. Off. ........ 91101734.1

[51] Int. Cl.$^5$ .............................................. B02C 11/08
[52] U.S. Cl. ........................................ 241/23; 241/24; 241/DIG. 10; 209/10; 134/25.1
[58] Field of Search ............. 241/24, 23, 29, DIG. 10; 134/25.1; 209/10, 235

[56] References Cited

U.S. PATENT DOCUMENTS

| | | | |
|---|---|---|---|
| 4,213,793 | 7/1980 | Starbuck | 241/24 X |
| 4,750,436 | 6/1988 | Maury et al. | 241/DIG. 10 X |
| 4,801,384 | 1/1989 | Steiner | 134/25.1 X |
| 4,881,475 | 11/1989 | De Leur | 241/DIG. 10 X |
| 4,975,198 | 12/1990 | Steiner | 134/25.1 X |
| 5,056,541 | 10/1991 | Schade et al. | |
| 5,111,756 | 5/1992 | Anderson | 241/DIG. 10 X |
| 5,143,305 | 9/1992 | Dunham et al. | 241/24 |

Primary Examiner—Mark Rosenbaum
Assistant Examiner—Frances Chin
Attorney, Agent, or Firm—Robert W. Becker & Associates

[57] ABSTRACT

A method for removing contaminants from contaminated material such as contaminated soils and contaminated construction debris comprises the following steps: Separating the materials into a first fraction having particles of a size greater than 50 mm and a second fraction comprising remaining particles; breaking up the particles of the first fraction into particles of a size smaller than 50 mm; combining the particles of a size smaller than 50 mm and the second fraction to a combined fraction; drying the combined fraction at a temperature of between 100° to 130° C.; breaking up the combined fraction into particles of a size smaller than 2 mm; and subjecting the particles of a size smaller than 2 mm to a distillation process at a process temperature from between 300° to 600° C. Preferably, the distillation process is a vacuum distillation process with a process temperature of between 350° to 450° C.

21 Claims, 2 Drawing Sheets

METHOD FOR REMOVING CONTAMINANTS FROM CONTAMINATED MATERIALS SUCH AS CONTAMINATED SOILS AND CONSTRUCTION DEBRIS

BACKGROUND OF THE INVENTION

The present invention relates to a method for removing contaminants from contaminated materials, especially contaminated soils and construction debris, in which the contaminated material after removing coarse particles by screening and breaking, is subjected to a distillation process at a temperature of 300° to 600° C., preferably a vacuum distillation process at a temperature of 350° to 450° C.

It has been known from U.S. Pat. No. 5,056,541 to pretreat contaminated soils containing coarse particles by screening and breaking and subjecting the so treated soils to an extraction process with washing water containing additives, subsequently separating the soils from the washing water, then rinsing with rinsing water and removing the extracted contaminants from the rinsing water by a further cleaning process. In this method the extraction process with washing water optionally containing additives is essentially carried out as a separate process independent from the one or more-step rinsing and sorting process, whereby a finest fraction of a particle size of 150 μm is separated from the soils before the extraction step by dry or wet classifying methods. The dried finest fraction is subsequently subjected to a distillation step. With this known method the cleaning of contaminated soils is possible; however, the known method is disadvantageous with respect to energy consumption and cost factors because the soils which have been separated from coarse particles by screening or breaking are subjected to a substantial pretreatment in the form of extraction, rinsing, and drying processes before the dried finest fraction finally undergoes the distillation step. The disadvantageously high energy costs primarily result from the fact that soils naturally contain approximately 10 to 15% water while the soils being treated according to this known method will have a water contents of at least 30% after the wet washing process, even after undergoing an optimal pressing step in a chamber filter press.

It is therefore an object of the present invention to simplify the method of the prior art and to carry out the pretreatment of the soils containing coarse particles such that the material being subjected to the distillation process will not accumulate water during the pretreatment step.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
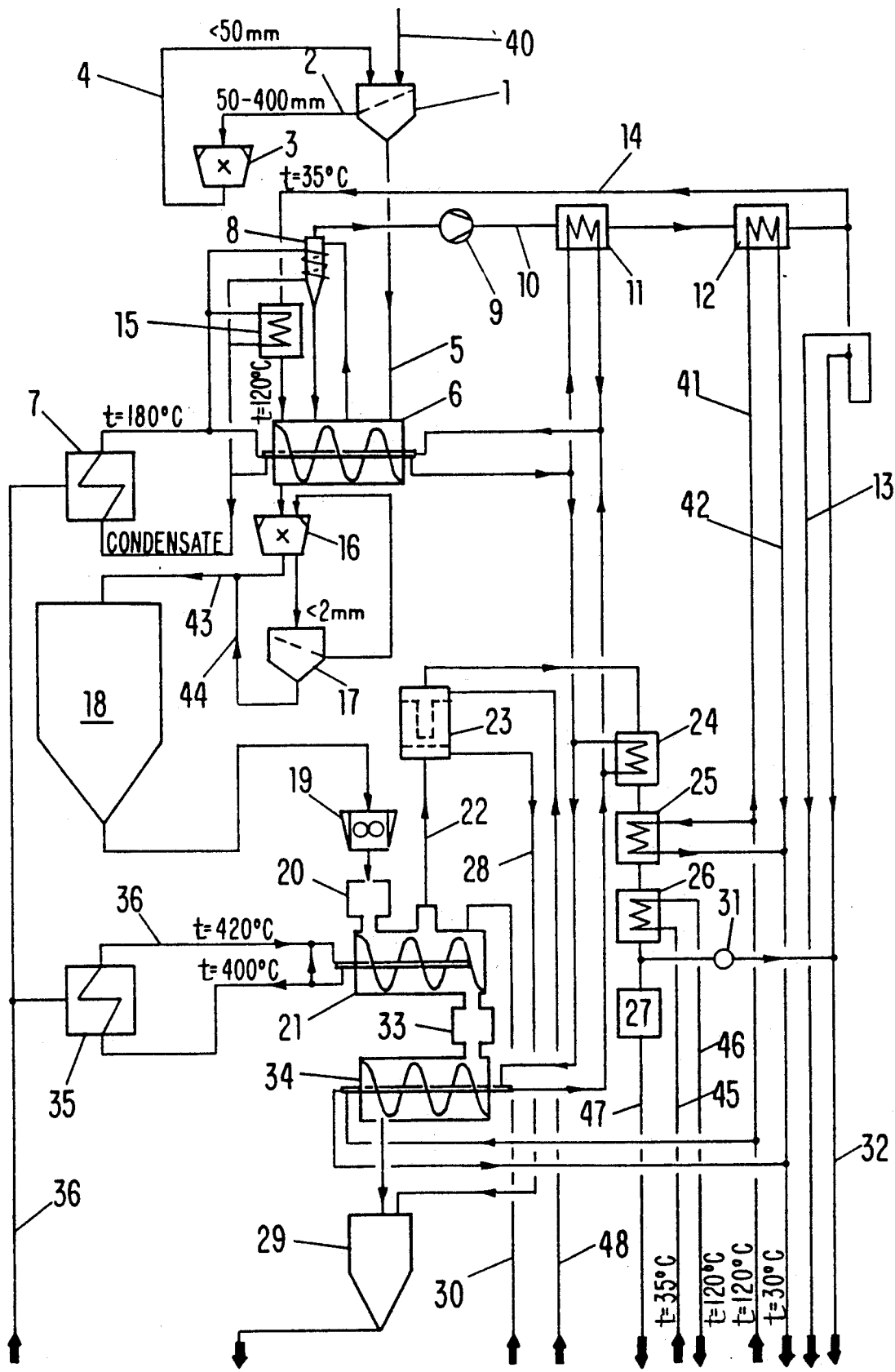
FIG. 1 is a schematic representation of the inventive process for removing contaminants from contaminated material by distillation, whereby the distillation is carried out in a disk-type dryer.

The method for removing contaminants from contaminated materials according to the present invention is primarily characterized by the following steps: Separating the materials into a first fraction having particles of a size of greater than 50 mm and a second fraction comprising remaining particles; breaking up the particles of the first fraction into particles of a size smaller than 50 mm; combining the particles of a size smaller than 50 mm and the second fraction to a combined fraction; drying the combined fraction at a temperature of between 100° to 130° C.; breaking up the combined fraction into particles of a size smaller than 2 mm; and subjecting the particles of a size smaller than 2 mm to a distillation process at a temperature from between 300° to 600° C.

Surprisingly, the object of the present invention may be solved, based on the method of the prior art, when the contaminated soil after having been freed of course particles and before the distillation step, is pretreated such that the fraction of particles with a size greater than 50 mm is separated from the contaminated material, is then broken up into particles of a size smaller than 50 mm, is then combined with the fraction of contaminated material having a particle size smaller than 50 mm resulting from the separation step, is subjected to a drying process at a temperature of 100° to 130° C. and is then broken up into particles of a size smaller than 2 mm. Thus, expensive extraction and rinsing processes may be eliminated, and the contaminated soil may be treated in a technically and economically acceptable manner even when originally present in various forms, particle sizes and degrees of contamination. Furthermore, the energy expenditures may be substantially reduced because in the inventive method only the naturally occurring water contents of 5 to 15% maximum must be removed instead of the approximately 30% of water contained in the soils treated with the process of the prior art according to which an extraction and a subsequent dewatering step with a filter press must be carried out.

It is expedient to remove water to a value of less than 5 weight-%, preferably, 1 weight-%.

The present invention further provides for a vacuum distillation process at a process temperature of between 350° to 450° C. It is expedient to provide an oxygen-poor atmosphere for destroying and reducing the amount of dioxin compounds such as TCDD (tetrachlorodibenzodioxin), and further to pre-heat for a period of 30 minutes to reach the required process temperature and, within a reaction time of less than 2 hours, distill off volatile organic and inorganic compounds within a boiling range of less than 400° C. The pressure range for this process is approximately 100 mbar, preferably, less than 50 mbar. In another preferred embodiment of the present invention, a flushing gas is provided in the vacuum distillation process for forming distillable volatile heavy metal complexes. The flushing gas may be CO, fluorine, and $(CN)_2$. It is expedient to provide a catalyst for forming the distillable volatile heavy metal complexes. Such heavy metal complexes may be carbonyles.

The step of drying is preferably carried out in an indirect manner. A heating medium is provided which is selected from the group consisting of steam and a heat carrier oil. In a preferred embodiment of the present invention the distillation process is carried out with a heating medium selected from the group consisting of a heat carrier oil, a fused salt bath, and a fuel gas. Expediently, the distillation is carried out in a device selected from the group consisting of a disk-type dryer, a worm gear-type dryer and a helical dryer. In another advantageous embodiment of the present invention the heat for the distillation process is provided with a heating medium in the form of a solid material having a particle size greater than 2 mm. The solid material is heated with a heating device using fluid fuel such as gas or oil. Subsequently, the heated solid material is mixed with the soil particles of a size smaller than 2 mm. After the distillation process, the solid material is removed from the soil particles of a size smaller than 2 mm by a screening step. The solid material is recycled, reheated and reused in the distillation process. The volume and the particle size of the solid material is selected such that the soil particles of a size smaller than 2 mm are heated to and maintained at the process temperature of 300° to 600° C, preferably 400° C., during the distillation process, whereby the solid material and the soil particles of a size smaller than 2 mm form a porous mixture allowing removal of the contaminants in the form of vapors at the upper end of the respective reactor. In a preferred embodiment, the heat energy contained in the vapors of the distillation process and contained in the heated solid material may be used to preheat the steam required for the drying step and/or for heating purposes within the dryer.

DESCRIPTION OF THE PREFERRED EMBODIMENTS

The present invention will now be described in detail with the aid of several specific embodiments utilizing FIGS. 1 and 2.

In the method schematically represented in FIG. 1 the contaminated material which may be contaminated soil or contaminated construction debris, is guided by a feeding device 40 to a screen 1 where a first fraction having particles of a size greater than 50 mm is removed from the contaminated material. The first fraction is guided via a slide and a belt 2 to a breaking or grinding device 3 where it is broken up into particles of a size smaller than 50 mm and is then recycled to the screen 1 via a belt 4. The second fraction which fell through the screen is fed via a belt 5 to a disk-type dryer 6 in which it is dried with a heat carrier medium (heating medium), for example, steam, coming from a heat generator 7. Solid particles are removed from the vapors by a multicyclone 8 and the solid particles are recycled into the dryer 6. The vapors which are collected at the head of the cyclone 8 are conveyed by a blower 9 via the line 10 to a condenser 11 where they are condensed. The gained energy is used for heating the disk-type dryer 6. In a further condenser 12 which is arranged downstream the exhaust air is cooled to a temperature of approximately 30° C. Cooling water for the condenser 12 having a temperature of approximately 20° C. is supplied via an inlet line 41 and removed via an outlet line 42. The collected condensate is guided via the line 13 to a waste water sanitation and cleaning device while the exhaust air having a temperature of approximately 35° C. is recirculated via a line 14 and a heating unit 15 to the disk-type dryer 6 as flushing air.

The heating device 15 in which the exhaust air is heated to a temperature of approximately 120° C. operates with steam or another heating medium coming from the heat generator 7. The material which has been treated in the disk-type dryer 6 is then conveyed to a grinding device 16 in which it is ground to a particle size of less than 2 mm. In general, the ground material is directly transported, for example, via a pneumatic conveyor 43, to a silo 18 and from there via a grinding device 19 in which the material is deagglomerated is conveyed to the air lock 20 of the vacuum distillation unit 21. Alternatively, the ground material coming from the grinding device 16 may be conveyed to a screen 17 where a fraction of a particle size of less than 2 mm is separated and guided to the silo 18 via a line 44. The material which is rejected by the screen is then recirculated into the grinding device 16. The vacuum distillation unit 21 is heated at the bottom with the aid of a heat carrier oil or a fused salt bath or similar means to the process temperature of preferably 400° C. whereby the residing time is preferably more than 1 hour.

The formed gasses are removed via the line 22 and, after the removal of solid particles in a high temperature filter 23 which in order to avoid condensation is heated, are guided to a first condensation unit 24. The energy which is gained here is used for heating the disk-type dryer 6. In a second condensation unit 25 the air is cooled to a temperature of approximately 25° C. with cooling water coming from the line 41, and in a third condensation unit 26 the air is cooled to a temperature of below 5° C. with the aid of a refrigerated water bath containing salts and having a temperature of −20° C. to −25° C. The inlet line is shown at 45 and the outlet line is shown at 46.

The collected condensate from the distillation which contains highly concentrated contaminants is then fed via a collector 27 and a line 47 to a combustion device for remediation purposes. The filter 23 is flushed with an inert gas which is guided into the system via the line 48, and the collected solids are guided via the line 28 to the end product receptacle 29. The vacuum distillation unit 21 is supplied with flushing gas via a line 30. The flushing gas together with the air is conveyed via a waterring vacuum pump 31 which generates a vacuum of 20 to 50 Torr and via the line 32 to an exhaust gas scrubbing unit.

The cleaned material, respectively, cleaned soil is conveyed from the vacuum distillation unit 21 via air locks 33 to a cooling device 34. A portion of the energy contained in the cleaned material respectively cleaned soil is also used for heating purposes. The cooling device 34 is a two-step device. In a post-cooling step the temperature of the cleaned material, respectively, cleaned soil is lowered with the aid of water to a temperature of 40° to 50° C. The product, i.e., the cleaned material, respectively, the cleaned soil, is then guided via a pneumatic conveying means to the end product receptacle 29. The reference numeral 35 designates a further heat generator in which the heating medium used for the distillation process is heated to the required temperature of, for example, 420° C. by a heat supplying medium provided via the line 36.

Figure 2:
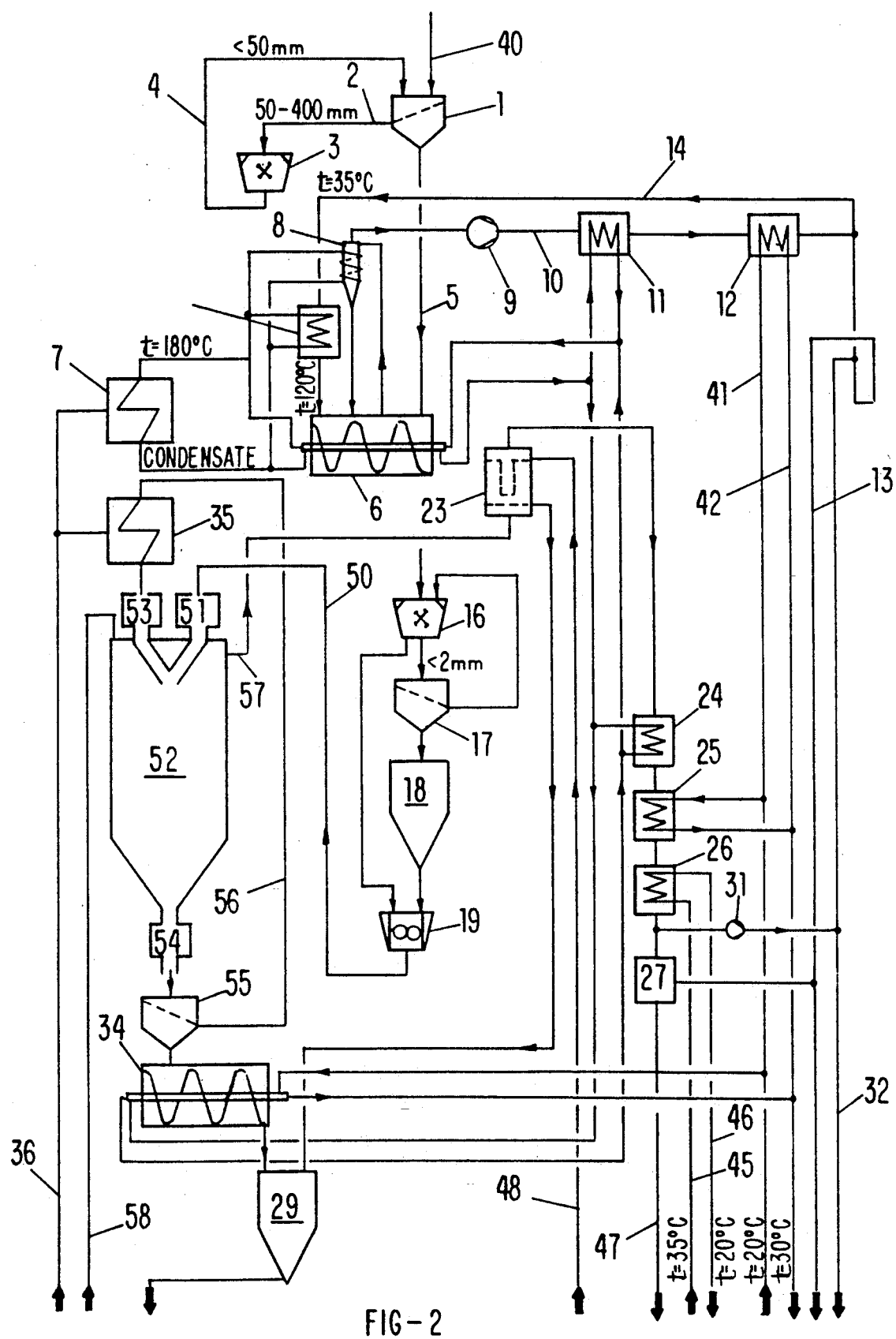
FIG. 2 is a schematic representation of the inventive method for removing contaminants from contaminated material by distillation in which a solid material is used as the heat carrier for the distillation step.

The embodiment represented in FIG. 2 is based on the same principle as the embodiment of FIG. 1. Accordingly, the same reference numerals are used for corresponding components so that for the understanding and description of respective components reference is made to the embodiment of FIG. 1.

The embodiment according to FIG. 2 differs from the aforementioned method and design by the construction and operation of the vacuum distillation unit.

The contaminated material which is coming from the silo 18 and which has been deagglomerated in the grinding device 19 as described above is conveyed via a line 50 to the air lock 51 of a distillation unit 52 in which the bottom is heated by a solid material functioning as the heat carrier medium (heating medium), whereby the solid material is heated within the heat generator 35 and is fed into the distillation unit via a lock 53. The heat carrier medium or heating medium is preferably in the form of gravel having a particle size of 4 to 10 mm. The volume of heat carrier medium corresponds to a multiple of the throughput of contaminated material in order to be able to heat the contaminated material to a temperature of approximately 400° C. The mixture of gravel and contaminated material is removed via the air lock 54 and is separated via the screen 55. The gravel is recirculated via the conveying system 56 to the heat generator 34 in which the pebbles are directly heated and is then reintroduced via the lock 53 into the distillation unit 52. The vapors and gasses which are formed in the distillation unit 52 are removed via the line 57 and introduced into the high temperature filter 23. The cleaned material, respectively, cleaned soil which has been separated by the screen 55 is recirculated via the cooling device S4 to the end product receptacle 29. The high temperature filter 23 and the system components arranged downstream as well as the cooling device 34 are operated in the same manner as disclosed for the method of FIG. 1. The flushing gas line is designated with reference numeral 58 and corresponds to the flushing gas line 30 of the first embodiment.

The present invention is, of course, in no way restricted to the specific disclosure of the specification and drawings, but also encompasses any modifications within the scope of the appended claims.

What I claim is:

1. A method for removing contaminants from contaminated materials, comprising the steps of:
    separating the materials into a first fraction having particles of a size greater than 50 mm and a second fraction comprising remaining particles;
    breaking up said particles of said first fraction into particles of a size smaller than 50 mm;
    combining said particles of a size smaller than 50 mm and said second fraction to a combined fraction;
    drying said combined fraction at a temperature of between 100° to 130° C.;
    breaking up said combined fraction into particles of a size smaller than 2 mm; and
    subjecting said particles of a size smaller than 2 mm to a distillation process at a process temperature from between 300° to 600° C.

2. A method according to claim 1, wherein said distillation process is a vacuum distillation process, said process temperature being from between 350° to 450° C.

3. A method according to claim 2, further comprising the steps of:
    providing an oxygen-poor atmosphere for destroying and reducing dioxin compounds;
    reaching said process temperature during a period of 30 minutes;
    providing a reaction time of less than 2 hours for distilling off volatile organic and inorganic compounds within a boiling range of less than 400° C.; and
    providing a pressure of less than 100 mbar.

4. A method according to claim 3, wherein said pressure is less than 50 mbar.

5. A method according to claim 2, further including the step of providing a flushing gas in said vacuum distillation process for forming distillable volatile heavy metal complexes.

6. A method according to claim 5, wherein said flushing gas is selected from the group consisting of CO, fluorine, and $(CN)_2$.

7. A method according to claim 7, further comprising the step of providing a catalyst for forming said distillable volatile heavy metal complexes.

8. A method according to claim 7, wherein said heavy metal complexes are metal carbonyls.

9. A method according to claim 1, wherein, in said step of drying, water is removed to a value of less than 5 weight-%.

10. A method according to claim 9, wherein water is removed to a value of less than 1 weight-%.

11. A method according to claim 1, wherein in said step of drying said combined fraction is indirectly heated in a dryer with a heating medium.

12. A method according to claim 1, further including the step of providing a heating medium for said drying step.

13. A method according to claim 12, wherein said heating medium is selected from the group consisting of steam and a heat carrier oil.

14. A method according to claim 12, further comprising the step of using heat energy contained in vapors removed in said distillation process for heating purposes in said drying step.

15. A method according to claim 14, wherein said heat energy contained in said vapors is used for preheating said heating medium.

16. A method according to claim 1, further comprising the step of providing heat for said distillation process with a heating medium selected from the group consisting of a heat carrier oil, a fused salt bath, and a fuel gas.

17. A method according to claim 1, wherein said distillation is carried out in a device selected from the group consisting of a disk-type dryer, a worm gear-type dryer, and a helical dryer.

18. A method according to claim 1, further comprising the steps of:
    providing heat for said distillation process with a heating medium in the form of solid material having a particle size greater than 2 mm;
    heating said solid material with a heating means using fluid fuel;
    subsequently, mixing said heated solid material with said particles of a size smaller than 2 mm:
    after said distillation process, removing said solid material from said particles of a size smaller than 2 mm by screening; and
    recycling said solid material to said heating step.

19. A method according to claim 18, wherein a volume and a particle size of said solid material is selected such that said particles of a size smaller than 2 mm are heated to and maintained at said process temperature of 300° to 600° C. during said distillation process, and wherein said solid material and said particles of a size smaller than 2 mm form a porous mixture allowing removal of the contaminants in the form of vapors.

20. A method according to claim 19, wherein said process temperature is 400° C.

21. A method according to claim 18, further comprising the step of using heat energy contained in said solid material for heating purposes in said drying step.

* * * * *